(12) United States Patent
Hixon (10) Patent No.: US 11,628,635 B2
(45) Date of Patent: Apr. 18, 2023

(54) CROSS-CORRUGATED SUPPORT STRUCTURE

(71) Applicant: Applied Structural Materials, LLC, New Orleans, LA (US)

(72) Inventor: Neal Hixon, New Orleans, LA (US)

(73) Assignee: Applied Structural Materials, LLC, New Orleans, LA (US)

( * ) Notice: Subject to any disclaimer, the term of this patent is extended or adjusted under 35 U.S.C. 154(b) by 452 days.

(21) Appl. No.: 16/486,772

(22) PCT Filed: Aug. 21, 2017

(86) PCT No.: PCT/US2017/047792
§ 371 (c)(1),
(2) Date: Aug. 16, 2019

(87) PCT Pub. No.: WO2019/040042
PCT Pub. Date: Feb. 28, 2019

(65) Prior Publication Data
US 2021/0138714 A1    May 13, 2021

(51) Int. Cl.
*E04C 5/07* (2006.01)
*E04C 5/06* (2006.01)
(Continued)

(52) U.S. Cl.
CPC .............. *B29C 70/36* (2013.01); *B29C 53/24* (2013.01); *E04C 5/06* (2013.01); *E04C 5/07* (2013.01);
(Continued)

(58) Field of Classification Search
USPC ....................................................... 428/604
See application file for complete search history.

(56) References Cited

U.S. PATENT DOCUMENTS 3,217,845 A  11/1965 Reynolds
3,357,147 A  12/1967 Lerner
(Continued)

FOREIGN PATENT DOCUMENTS

| KR | 1020120029681 | * | 3/2012 | ............... E04C 2/08 |
| WO | 2007-003043 A1 |  | 1/2007 |  |
| WO | 2015-067440 A1 |  | 5/2015 |  |

OTHER PUBLICATIONS

Machine translation of KR 1020120029681 (translated Jul. 21, 2022 kipris) (Year: 2012).*
(Continued)

*Primary Examiner* — Elizabeth Collister
(74) *Attorney, Agent, or Firm* — AdamsIP, LLC; James Adams; Stephen Thompson (57) ABSTRACT

A cross-corrugated support structure includes a sheet having a first and a second set of corrugations. The first set of corrugations is defined by a series of alternating ridges and grooves that extend the length of the sheet in a first direction. The second set of corrugations is also defined by a series of ridges and grooves that extend the length of the sheet in a second direction that intersects with the first direction. The intersection of the first and second set of corrugations creates cross-corrugations throughout the sheet. To provide compressive and tensile strengths suitable for large-scale construction applications, the sheet may be made of a carbonaceous material such as carbon fiber or graphite treated to rigidly retain a shape including the first and second set of corrugations within the sheet. The sheet may be reinforced by securing support members or additional corrugated sheets to the sheet.

19 Claims, 7 Drawing Sheets

(51) Int. Cl.
    *B29L 16/00*     (2006.01)
    *B29C 70/36*     (2006.01)
    *B29C 53/24*     (2006.01)
    *B29C 51/10*     (2006.01)

(52) U.S. Cl.
    CPC ........ *B29C 51/10* (2013.01); *B29C 2791/006* (2013.01); *B29L 2016/00* (2013.01)

(56) References Cited

U.S. PATENT DOCUMENTS

| | | | |
|---|---|---|---|
| 3,741,859 A * | 6/1973 | Wandel | B31F 1/2813 156/271 |
| 5,449,543 A | 9/1995 | Bach et al. | |
| 5,609,942 A | 3/1997 | Ray | |
| 5,797,230 A | 8/1998 | Lassen | |
| 2003/0068472 A1 | 4/2003 | Benson et al. | |
| 2005/0123717 A1 | 6/2005 | Shen et al. | |
| 2011/0195230 A1 | 8/2011 | Hanson | |
| 2012/0186165 A1 | 7/2012 | Wilsey | |
| 2013/0333854 A1 | 12/2013 | Noble et al. | |
| 2018/0281341 A1 * | 10/2018 | Granberg | B65D 65/406 |

OTHER PUBLICATIONS

Notice of Allowance, dated Aug. 13, 2021, for related U.S. Appl. No. 16/486,790, filed Aug. 16, 2019, to Hixon.
U.S. Appl. No. 16/486,790, filed Aug. 16, 2019, Non-final Office Action, dated Oct. 2, 2020.
U.S. Appl. No. 16/486,790, filed Aug. 16, 2019, Response to Non-final Office Action dated Oct. 2, 2020, filed Jan. 4, 2021.
U.S. Appl. No. 16/486,790, filed Aug. 16, 2019, Final Office Action, dated Feb. 8, 2021.
U.S. Appl. No. 16/486,790, filed Aug. 16, 2019, Response to Final Office Action dated Feb. 8, 2021, filed Apr. 26, 2021.
Appl. No. PCT/US17/47792, filed Aug. 21, 2017, International Search Report, dated Jun. 5, 2018.
Appl. No. PCT/US17/47792, filed Aug. 21, 2017, Written Opinion of the International Searching Authority, dated Jun. 5, 2018.
International Search Report, dated Feb. 26, 2018, for related Appl. No. PCT/US17/49172, filed Aug. 29, 2017.
Written Opinion of the International Searching Authority, dated Feb. 26, 2018, for related Appl. No. PCT/US17/49172, filed Aug. 29, 2017.
U.S. Appl. No. 17/527,026, filed Nov. 15, 2021, Non-final Office Action, dated Nov. 7, 2022.
Response filed on Dec. 16, 2022, to Non-final Office Action, dated Nov. 7, 2022, for U.S. Appl. No. 17/527,026, filed Nov. 15, 2021.

\* cited by examiner

CROSS-CORRUGATED SUPPORT STRUCTURE

CROSS-REFERENCE TO RELATED APPLICATION

This application is a United States National Stage Application of PCT/US17/47792, filed Aug. 21, 2017, which application is incorporated herein in its entirety by reference.

FIELD OF THE DISCLOSURE

The subject matter of the present disclosure refers generally to a cross-corrugated support structure.

BACKGROUND

Concrete blocks with steel beams encased therein for reinforcement are frequently used in the construction of large-scale structures, such as bridges and skyscrapers, because of the compressive and tensile strengths generally exhibited by concrete and steel. Oftentimes, the primary framework of a large-scale structure is defined by a plurality of such reinforced concrete blocks assembled together. However, concrete reinforced with steel is immensely heavy, so much so that the concrete blocks, or other structures, forming the framework of the structure generally cannot be fabricated on site. Rather, reinforced concrete components used in large-scale structures generally must be prefabricated at a designated factory or manufacturing site and subsequently transported to the construction site. Due to the weight of steel and concrete, the labor and transportation logistics associated with the manufacture and transportation of reinforced concrete is generally more complex, and thus costlier than other commonly used building materials, such as wood, aluminum, or plastic. Further contributing to this problem is the fact that the dimensions of reinforced concrete building components often prevent multiple units from being stacked during transport, thereby necessitating numerous trips from the fabrication site to the construction site and vice versa.

Other materials commonly used in construction projects that are of a lighter weight than reinforced concrete, including, but not limited to, wood, plastic, and aluminum, are generally incapable of withstanding the same compressive and/or tensile forces as reinforced concrete. Accordingly, such materials are generally unsuitable for use as key, force-bearing components in large-scale structures. Because introducing corrugations into a material generally serves to increase the tensile strength of the material in a direction running perpendicular to the corrugations, attempts have been made in the art to produce high strength-to-weight ratio materials by introducing corrugations within various metal and plastic materials. However, the materials reinforced through such efforts currently known within the art are nonetheless generally unsuitable for use in large-scale structures. This is often due to the fact that materials amenable to traditional corrugation techniques are generally not as strong as reinforced concrete, even when reinforced with corrugations.

Traditionally, the introduction of corrugations into a piece of material has been achieved through roll forming, i.e., passing the piece of material through one or more rolling dies. As the piece of material passes through the dies, the material deforms to match the contours of the rolling dies, thereby creating a series of corrugations within the material. As such, only deformable materials, i.e, materials that can be distorted by die rollers and retain such distortions, may be reinforced via corrugations using traditional methods. Thus, traditional corrugation methods cannot be used to form corrugations within certain materials exhibiting high compressive and tensile strengths that may serve as viable substitutes for reinforced concrete, such as fiber reinforced polymers.

Accordingly, there is a need in the art for a high strength-to-weight support structures that can be used in place of reinforced concrete during the construction of large-scale structures.

SUMMARY

A cross-corrugated support structure is provided. The support structure has a sheet having a first and a second plurality of corrugations. The sheet comprises a rigid material, rather than a deformable, malleable material, such as aluminum, stainless steel, or plastic sheets. To provide compressive and tensile strengths suitable for constructing large-scale structures, the sheet preferably comprises a carbonaceous material such as carbon fiber or graphene that is treated and cured to retain a rigid form. As such carbonaceous materials exhibit high compressive and tensile strengths and are much lighter than concrete reinforced with steel, the sheet may exhibit a greater strength-to-weight ratio than reinforced concrete. The first and the second plurality of corrugations within the rigid sheet are defined by a series of ridges and grooves and are oriented within the sheet such that the first and the second plurality of corrugations intersect. The intersection of the first and second plurality of configurations establishes a series of cross corrugations throughout the sheet that serve to reinforce the sheet. Depending on the intended application for which the support structure is being used and the strength requirements necessitated thereby, the number, dimensions, or orientations of the first and second plurality of corrugations within the rigid sheet may vary.

The sheet may be further reinforced by a support member secured thereto. Preferably, the support member is an elongated, rigid member. The support member may be transversely secured to a top or a bottom side of the rigid sheet such that the support member bridges the grooves or ridges of the first plurality of corrugations, respectively. A top side of the secondary grooves or an underside of the secondary ridges may provide a channel in which the support member may be placed within and secured thereto. A plurality of elongated support members may be used and secured to the top and/or bottom sides of the sheet. Alternatively, the support structure may comprise a first rigid sheet and a second sheet, each sheet having some or all of the above described features, secured together. The first and second sheets may be secured directly together or indirectly via one or more support members. The first rigid sheet may be secured to the second rigid sheet such that the corrugations of the respective sheets are in or out of phase with respect to one another.

The foregoing summary has outlined some features of the apparatus of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the apparatus disclosed herein. Those skilled in the pertinent art should also realize that such equivalent designs or modifications do not depart from the scope of the device of the present disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "rigid sheet" and grammatical equivalents thereof as used herein are understood to mean a sheet of non-malleable material which is devoid of flexibility such that the shape of the sheet cannot be bent or otherwise deformed by way of roll forming without breaking. The term "removably secured" and grammatical equivalents thereof are used herein to mean the joining of two components in a manner such that the two components are secured together, but may be detached from one another and re-secured together without requiring the use of specialized tools. As used herein, the term "thermosetting resin" and grammatical equivalents thereof are understood to mean a resin that irreversibly cures through the application of suitable heat thereto, a chemical reaction, and/or subjection to suitable irradiation.

Turning now to the drawings FIGS. 1-9 illustrate embodiments of a cross-corrugated support structure 100 or components thereof. The support structure 100 is generally designed to provide a building material exhibiting a high strength-to-weight ratio such that the support structure 100 may be used in place of heavier building materials such as concrete reinforced with steel. The support structure comprises a sheet 110 having a first plurality of corrugations 112 and a second plurality of corrugations 114 extending the length of sheet 110. The first plurality of corrugations 112 and the second plurality of corrugations 114 are oriented within the sheet 110 such that the first and second plurality of corrugations 112, 114 intersect, thereby creating a plurality of cross-corrugations throughout the sheet 110. The first plurality of corrugations 112 is defined by a series of primary ridges 112(a) and primary grooves 112(b), and the second plurality of corrugations 114 is defined by a series of secondary ridges 114(a) and secondary grooves 114(b).

Each corrugation within the first and second plurality of corrugations 112, 114 serves to increase the tensile and compressive strength of the sheet 110 in a direction perpendicular to the direction in which each respective corrugation extends. For instance, the first plurality of corrugations 112 may extend longitudinally and the second plurality of corrugations 114 may extend latitudinally within a plane of the sheet 110. In such embodiments, the first plurality of corrugations 112 serve to increase the tensile and compressive strength of the sheet 110 in a longitudinal direction, and the second plurality of corrugations 114 serve to increase the tensile and compressive strength of the sheet 110 in a latitudinal direction. The sheet 110 preferably comprises a rigid, non-deformable material to provide greater tensile and compressive strengths than those exhibited by corrugated sheets currently known in the art created via roll forming. The rigid sheet 110 preferably comprises a carbonaceous material, such as carbon fiber or graphene, in order to reduce the overall weight of the support structure 100.

For additional reinforcement, the support structure 100 may further comprise at least one support member 120 secured to the rigid sheet 110. The support member 120 may be elongated and transversely secured to the rigid sheet 110 such that the support member 120 bridges the grooves and/or ridges of the of the first plurality of corrugations 112. A plurality of elongated support members 120 may be secured to the top and/or bottom side of the rigid sheet 110 to define a plane to which other structures or objects may be secured or on which other structures or objects may rest. In addition, the support structure 100 may optionally comprise a first and a second corrugated sheet 110, 210, secured together. In such embodiments, the first and second sheet 110, 210 may be secured directly together or indirectly through the use of one or more support members 120.

As shown in FIGS. 1-9, the support structure 100 comprises a sheet 110 having a top side 118, a bottom side 119, a first and a second plurality of corrugations 112 and 114, and at least one support member 120 secured to the sheet 110. To provide for improved tensile and compressive strengths over those exhibited by corrugated sheets currently known in the art made of malleable materials—including, but not limited to aluminum, stainless steel, and various plastics—the sheet 110 of the present disclosure is preferably non-malleable. To this end, the sheet 110 preferably comprises a rigid sheet. The sheet 110 preferably comprises a carbonaceous material. Preferably, the sheet comprises carbon fiber or graphene due to the tensile and compressive strengths, fatigue properties, corrosion-resistance, and reduced weight of carbon fiber or graphene relative to malleable metals. In some instances, the carbonaceous material forming the sheet may be infused with thermosetting resin, e.g., epoxy, and subsequently cured. As the support structure 100 of the present disclosure may find use in various applications which do not require tensile and compressive strengths suitable for large-scale construction projects, the sheet 110 may alternatively comprise a malleable material including, but not limited to, aluminum, stainless steel, mild steel, copper, silver, gold, and various plastics.

Figures 1, 2:
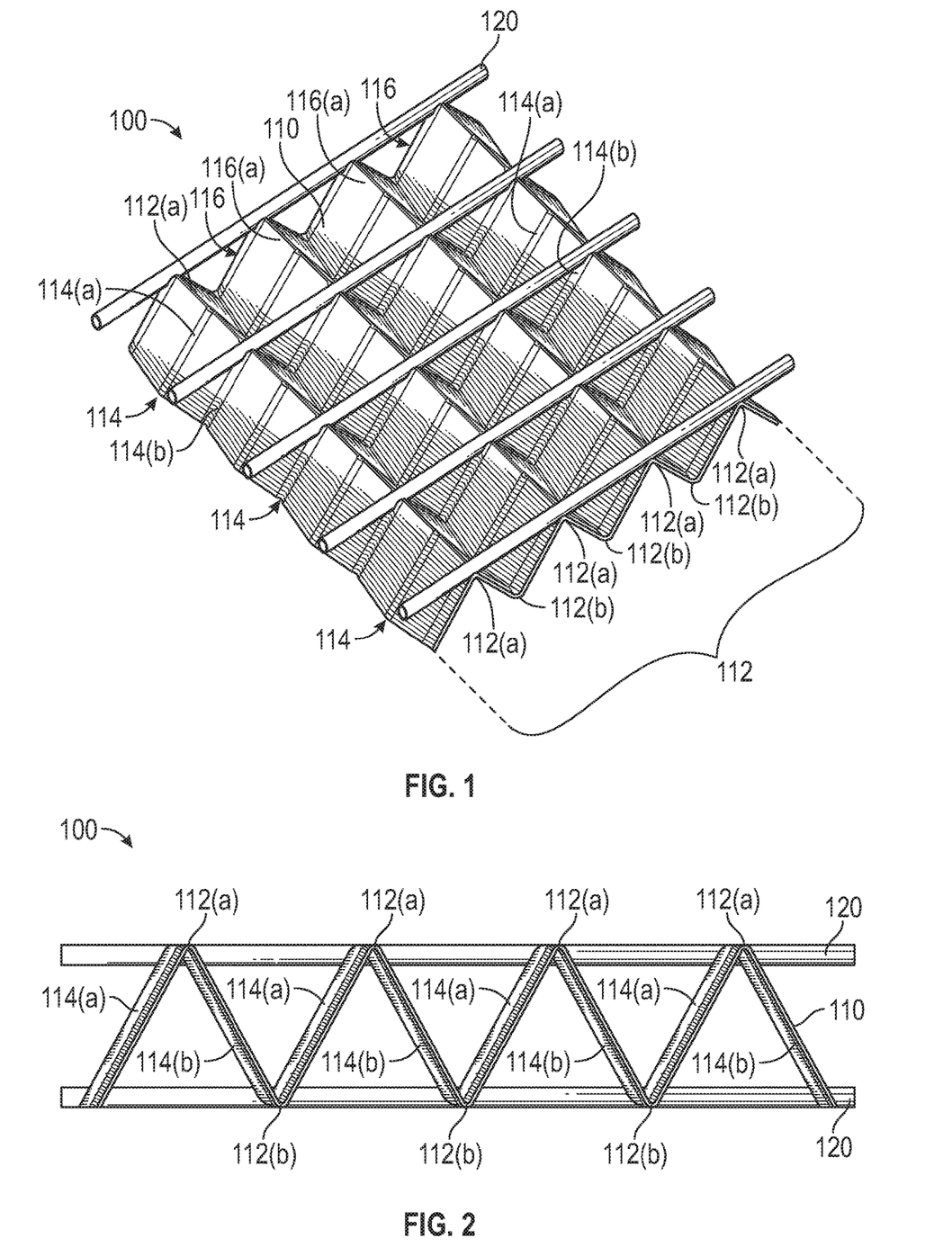
FIG. 1 is a perspective view of a support structure embodying features consistent with the principles of the present disclosure.
FIG. 2 is a side elevational view of a support structure embodying features consistent with the principles of the present disclosure.

The first plurality of corrugations 112 is defined by a series of primary ridges 112(a) and a series of primary grooves 112(b) extending the length of the sheet 110 in a first direction, as best shown in FIGS. 1-2. As further shown in FIG. 1-2, the corrugations defining the first plurality of corrugations 112 alternate between corrugations comprising primary ridges 112(a) and corrugations comprising primary grooves 112(b) such that a corrugation comprising a primary groove 112(b) immediately follows a corrugation comprising primary ridge 112(a). As shown in FIGS. 1-3 and 8-9, the alternating primary ridges 112(a) and primary grooves 112(b) cause the sheet 110 to retain a generally wave-like configuration in the first direction. Each primary ridge 112(a) is connected to an adjacent primary groove 112(b) via a face 116 of the sheet 110 that extends therebetween. The shape of the primary ridges 112(a) and primary grooves 112(b) may vary. For instance, the portion of the primary ridges 112(a) and primary grooves 112(b) disposed between the corrugations of the second plurality of corrugations 114 disclosed herein may generally retain a peaked shape, as shown in FIGS. 1-3 and 6-8. Alternatively, the primary ridges 112(a) and primary grooves 112(b) may retain a rounded shape, as shown in FIG. 9, or squared shape (not shown).

Figure 3:
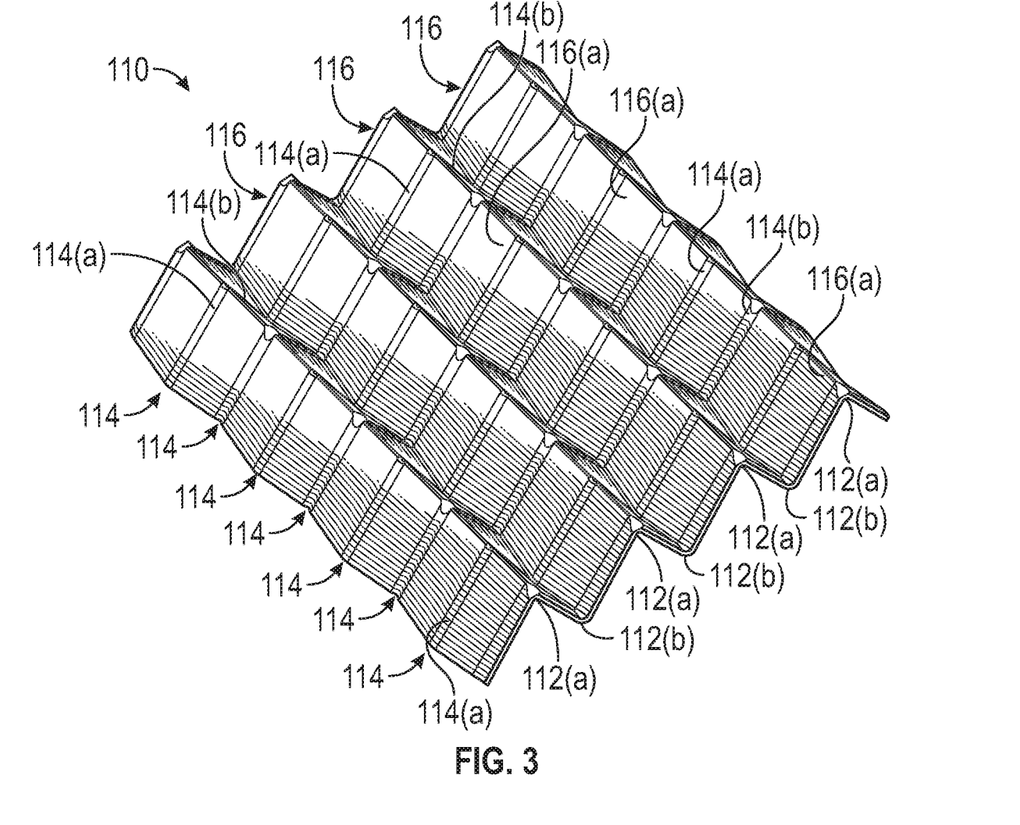
FIG. 3 is a perspective view of a sheet embodying features consistent with the principles of the present disclosure without support members attached thereto.
Figure 4:
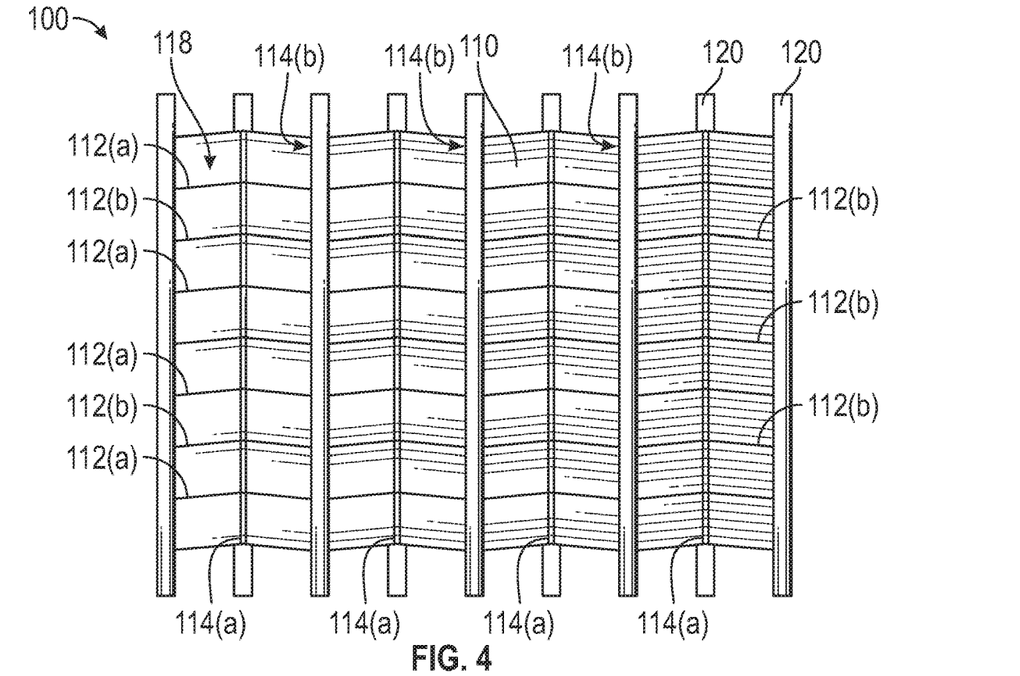
FIG. 4 is a top plan view of a support structure embodying features consistent with the principles of the present disclosure.
Figure 5:
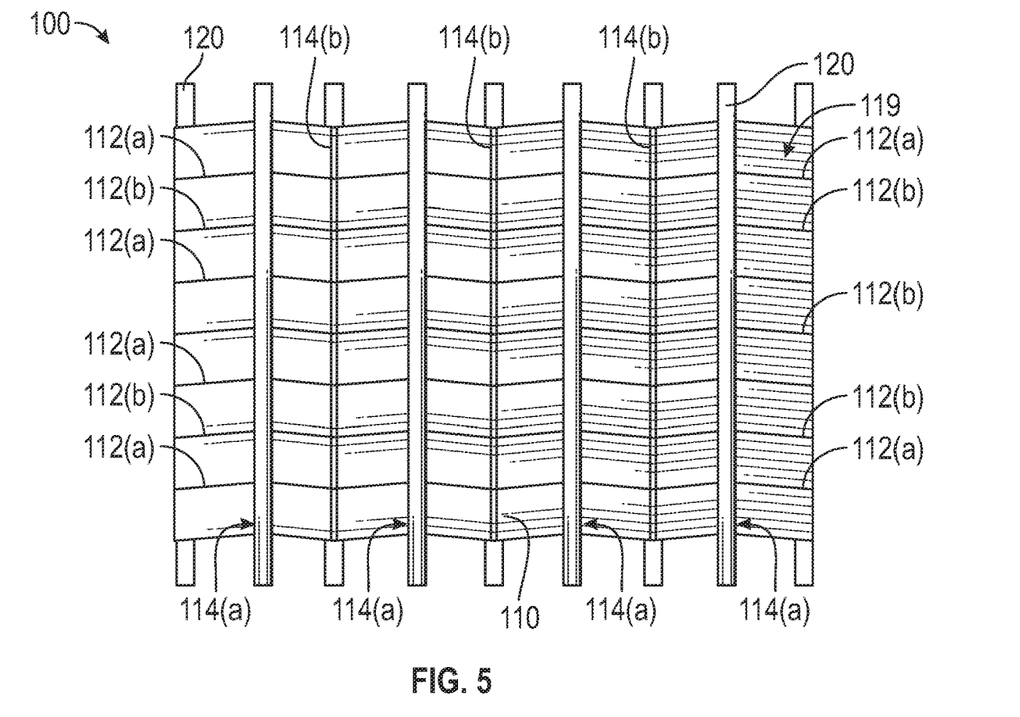
FIG. 5 is a bottom plan view of a support structure embodying features consistent with the principles of the present disclosure.

The second plurality of corrugations 114 are defined by a series of secondary ridges 114(a) and a series of secondary grooves 114(b) extending in a second direction that intersects with the first direction to which the first plurality of corrugations 112 extend. As the sheet 110 has a top and a bottom side 118 and 119, each secondary ridge 114(a) may form a ridge on the top side 118 of the sheet 110 and a groove on the bottom side 119 of the sheet 110, as shown best in FIGS. 4-5. Similarly, each secondary groove 114(b) may form a groove on the top side 118 of the sheet and a ridge on the bottom side 119 of the sheet 110, as best shown in FIGS. 4-5. The intersection of the first and second plurality of corrugations 112, 114 establishes a plurality of cross corrugations within the sheet 110. For instance, as shown best in FIGS. 1, 3, and 8-9, the first plurality of corrugations 112 may extend longitudinally along a length of the sheet 110 and the second plurality of corrugations 114 may extend latitudinally along a length of the sheet such that the first and second plurality of corrugations 112, 114 intersect perpendicularly. One of skill in the art will appreciate, however, that the direction in which the first plurality of corrugations 112 and the direction in which the second plurality of corrugations 114 extend and subsequently intersect may vary without departing from the inventive subject matter disclosed herein. As shown best in FIGS. 2-3, each corrugation within the second plurality of corrugations 114 initially ascends towards each primary ridge 112(a) and subsequently descends towards each primary groove 112(b). Accordingly, each corrugation within the second plurality of corrugations 114 intersects the face 116 extending between each primary ridge 112(a) and primary groove 112(b), thereby dividing each face 116 within the sheet 110 into a plurality of sub-faces 116(a).

Figure 6:
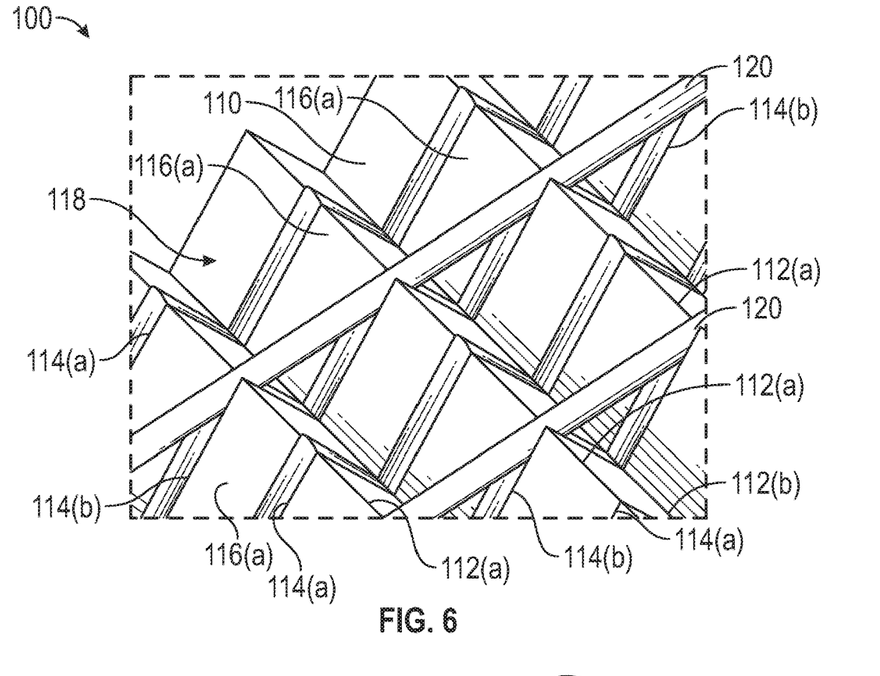
FIG. 6 is a partial magnified view of a support structure embodying features consistent with the principles of the present disclosure.

The arrangement of secondary ridges 114(a) and secondary grooves 114(b) within each corrugation of the second plurality of corrugations 114 may vary from application to application. For instance, each corrugation within the second plurality of corrugations may comprise a series of linearly alternating secondary ridges 114(a) and secondary grooves 114(b), as best shown in FIGS. 1-3. As shown in FIG. 2, each corrugation within the second plurality of corrugations 114 may comprise a secondary ridge 114(a) that ascends towards each primary ridge 112(a) that subsequently converts to a secondary groove 114(b) as the corrugation descends towards each primary groove 112(b). Alternatively, each corrugation within the second plurality of corrugations 114 may comprise either a continuous secondary ridge 114(a) or secondary groove 114(b), as shown in FIG. 6. Thus, the corrugations making up the second plurality of corrugations 114 may be arranged in an alternating fashion such that a corrugation comprising a continuous secondary ridge 114(a) is adjacent to a corrugation comprising a continuous secondary groove 114(b), as further shown in FIG. 6. Alternatively, the corrugations making up the second plurality of corrugations 114 may be arranged within the sheet 110 such that a corrugation comprising a continuous secondary ridge 114(a) or a continuous secondary groove 114(b) may be directly adjacent to a corrugation also comprising a continuous secondary ridge 114(a) or continuous secondary groove 114(b), respectively. Like the primary ridges 112(a) and primary grooves 112(b), the shape of the secondary ridges 114(a) and secondary grooves 114(b) may vary. As shown in FIG. 6, the secondary ridges 114(a) and secondary grooves 114(b) may be substantially rounded. Alternatively, secondary ridges and grooves 114(a), 114(b) may retain a peaked or squared shape.

Depending on the intended application, the number and dimensions of the first plurality of corrugations 112 and the second plurality of corrugations 114 may vary to accommodate different load types. For instance, to accommodate live loads the sheet 110 may have more corrugations—thereby increasing the surface area of the sheet, and thus the pounds per square inch the sheet 110 is capable of supporting without failing—than applications requiring the support structure 100 to support static loads. The depth of the primary ridges 112(a) and/or primary grooves 112(b), i.e., the distance between each primary peak 112(a) and/or adjacent primary groove 112(b) defined by a face 116, may be increased or decreased to respectively increase or decrease the tensile and compressive strengths exhibited by the sheet 110. Additionally, the distance from one primary peak 112(a) to another primary peak 112(a) and/or the distance from one primary groove 112(b) to another primary groove 112(b) may be decreased to increase the compressive and tensile strengths exhibited by the sheet 110. Similarly, the distance between the corrugations of the second plurality of corrugations 114 may also be reduced to increase the strength of the sheet 110. The corrugations of the first plurality of corrugations 112 may be equidistantly spaced with respect to each other, and the corrugations of the second plurality of corrugations 114 may be equidistantly spaced with respect to each other. Alternatively, the corrugations of the first plurality of corrugations 112 and/or the corrugations of the second plurality of corrugations 114 may be spaced at non-equidistant intervals with respect to each other throughout the sheet 110.

The general shape retained by the sheet 110 may also vary from application to application. For instance, the sheet 110 may be generally rectangular in shape, as shown in FIGS. 1, 3-5, and 7-9. Alternatively, the sheet 110 may be square, circular, triangular, polygonal or any other shape suitable for incorporating the first and second plurality of corrugations 112, 114 therein. Moreover, as the spatial dimensions from worksite to worksite or application to application may vary, the length, width, and depth of the sheet 110 may vary. For instance, the width and length of the sheet 110 may be greater in applications wherein the support structure 100 is being used in large-scale construction projects such as bridge construction than in applications wherein the support structure 100 is used to reinforce the hull of a boat.

As shown in FIGS. 1-2 and 4-9, the sheet 110 may be further reinforced by at least one support member 120 secured thereto. To reduce the overall weight of the support structure 100, the support member 120 may be elongated such that the support member 120 does not cover the entirety of the top side 118 and/or bottom side 119 of the sheet 110 when secured thereto. The use of an elongated support member 120 may also serve to leave the first and second plurality of corrugations 112, 114 exposed, at least partially, during use of the support structure 100. In some applications, exposed portions of the first and second plurality of corrugations 112, 114 may be filled with particulates or various types of substances. For instance, in some applications the exposed portions of the first and second plurality of corrugations 112, 114 may serve to collect and subsequently direct water flow. To provide another example, in some applications, the support structure 100 may be used in place of steel and be encased with concrete to create reinforced concrete blocks.

Figure 7:
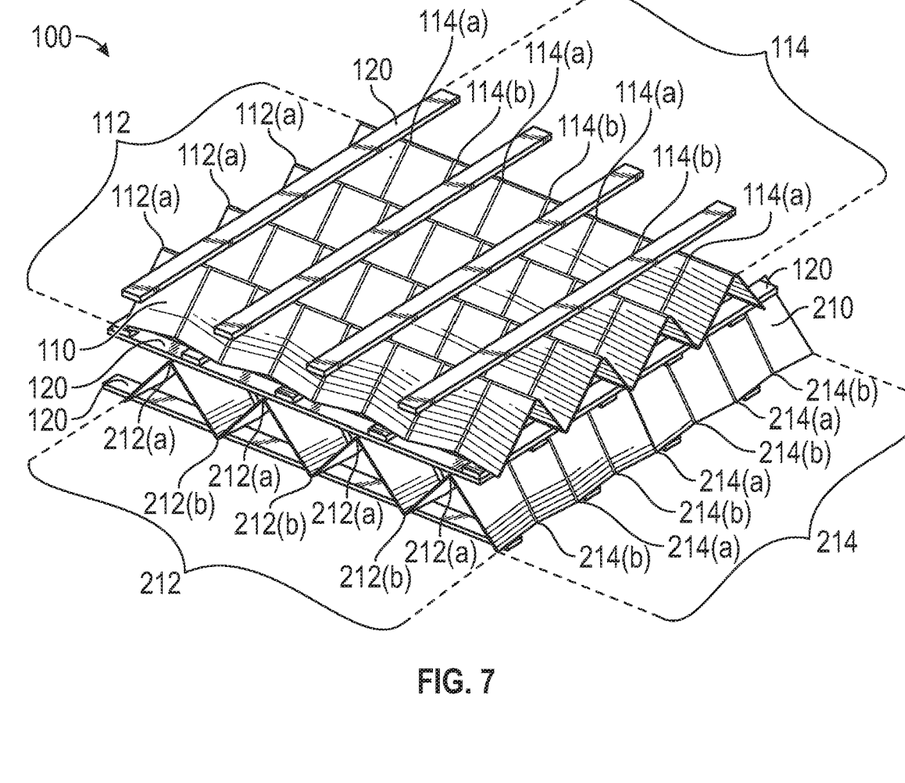
FIG. 7 is a perspective view of a support structure embodying features consistent with the principles of the present disclosure.

The support member 120 preferably comprises a rigid elongated member such as a rod, as shown in FIGS. 1-2, 4-6, and 8-9, or a bar, as shown in FIG. 7. The elongated support member 120 preferably comprises a rigid metal material, such as high-carbon steel. The elongated support member 120 may comprise steel that is greater than 0.25% carbon by weight. However, one of skill in the art will appreciate that the elongated support member 120 may comprise other suitable materials including, but not limited to, various other types of metals, plastic, wood, stone, or combinations thereof without departing from the inventive subject matter herein. Alternatively, the support member 110 may comprise a faceplate 300 or an elongated flexible strap.

As show best in FIGS. 1, 4, and 7-9, the support structure 100 may have a plurality of support members 120 secured to the sheet 110. The support members 120 may be equidistantly spaced with respect to each other. Alternatively, the support members may be spaced at non-equidistant intervals. As shown in FIGS. 1-2 and 4-9, the support members 120 may be secured to the top side 118 of the sheet 110, the bottom side 119 of the sheet 110, or both. Preferably, the support members 120 are secured to the top side 118 of the sheet 110 such that each support member 110 is transversely secured to each primary ridge 112(a) on the top side 118 and bridges each primary groove 112(b), as shown in FIGS. 1-2, 4, 6-7, and 9. Similarly, the support members 120 may be secured to the bottom side 119 of the sheet 110 such that each support member is transversely secured to each primary groove 112(b) on the bottom side 119 and bridges each primary ridge 112(a), as shown in FIGS. 2, 5-7, and 9. Alternatively, the support members 120 may have a wave-like shape generally matching the shape formed by the first plurality of corrugations 112 in the first direction. In this case, the support members 120 may be secured to the sheet 110 such that the support members 120 are secured to each face 116 extending between the primary ridges 112(a) and primary grooves 112(b).

Figure 8:
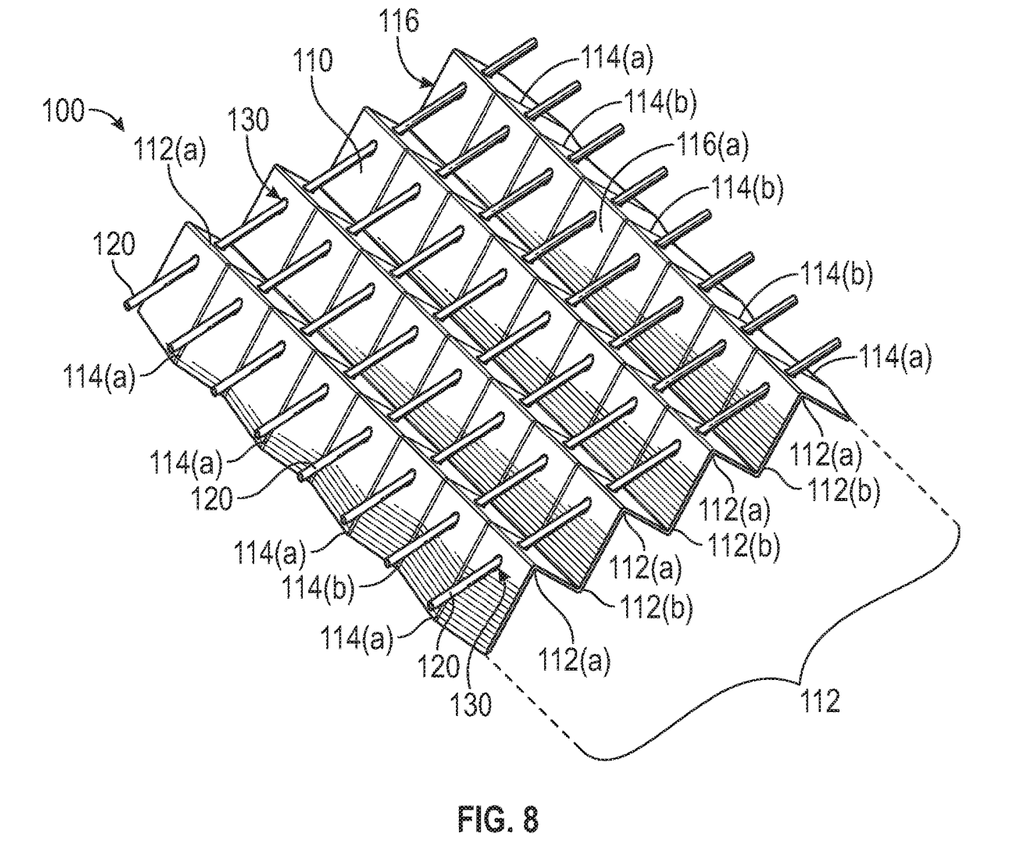
FIG. 8 is a perspective view of a support structure embodying features consistent with the principles of the present disclosure.
Figure 9:
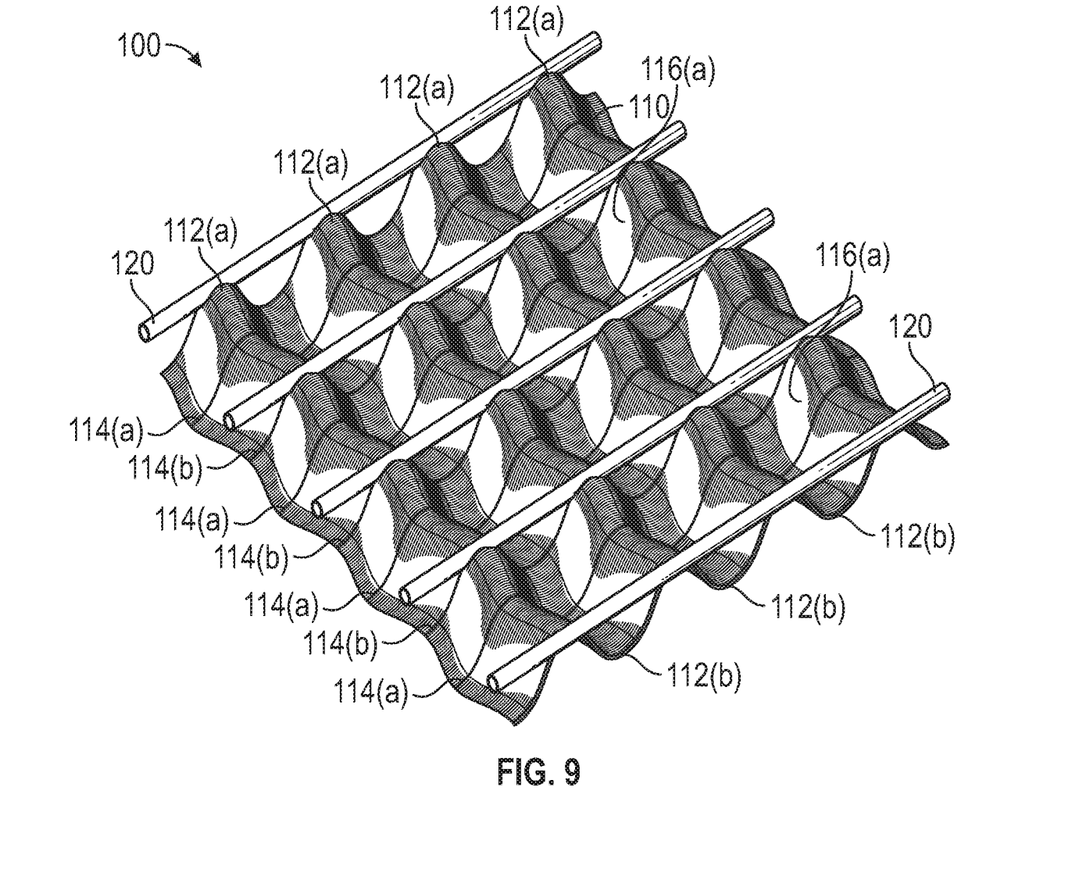
FIG. 9 is a perspective view of a support structure embodying features consistent with the principles of the present disclosure.

The support members 120 may be secured to the sheet 110 such that the support members 120 are disposed between the corrugations of the second plurality of corrugations 114, as shown in FIGS. 7-8. Preferably, the support members 120 may be secured, at least partially, within the corrugations of the second plurality of corrugations 114, as shown in FIGS. 1, 4-6, and 9. In instances where each corrugation of the second plurality of corrugations 114 comprises either a continuous secondary ridge 114(a) or a continuous secondary groove 114(b), the portion of the secondary grooves 114(b) on the top side 118 of the sheet 110 may form a channel in which a support member 120 may be partially housed, as shown best in FIG. 6. The portion of the secondary ridges 114(a) on the bottom side 119 of the sheet 110 may similarly form a channel in which the support members 120 may be partially housed. The depth of the channels formed by the secondary ridges 114(a) and secondary grooves 114(b) are preferably such that the support members 120 are flush with the apex of the primary grooves 112(b) and the primary ridges 112(a), respectively, when secured therein, as best shown in FIGS. 6 and 9. As seen in FIG. 3, the sheet 110 may have an additional grooved section across the apex of each primary ridge 112(a) where a support member 120 will be installed. The grooved section may have a depth greater than that of a secondary groove 114(a) so that the support members 120 are flush with the apex of the primary ridge 112(a) when secured thereto. Preferably, the support members 120 are permanently secured to the top side 118 and/or bottom side 119 of the sheet 110. The support members 120 may be permanently secured to the sheet 110 via thermosetting resin, as described herein. Alternatively, the support members 120 may be removably secured to the sheet 110 using any suitable instrument or device configured to removably secure one object to another. For instance, one or more coupling members configured to interlock with a support member 120 may be permanently secured to the top side 118 and/or to the bottom side 119 of the sheet.

To further reduce the overall weight of the support structure 100, the sheet 110 may have a plurality of bores 130, or openings, therein, as shown in FIG. 8. In some applications, the bores 130 within the sheet 110 may facilitate drainage from a first surface or area to pass through the sheet 110 to a second surface or area. Each face 116 extending between the primary ridges 112(a) and primary grooves 112(b) may have at least one bore 130 extending therethrough. The bores 130 extending through each face 116 are preferably aligned such that a support member 120 may be secured to the sheet 110 by inserting the support member 120 through the aligned bores 130. As shown in FIG. 8, each sub-face 116(a)

may have a bore 130 extending therethrough. The bore 130 of each sub-face 116(a) is aligned with the bore 130 extending through an opposite sub-face 116(a) such that each support member 120 within a plurality of support members 120 may be secured to the sheet 110 by inserting the support member 120 through a series of aligned bores 130, as further shown in FIG. 8.

Because certain flexible carbonaceous materials like carbon fiber and graphene are not amenable to traditional roll-forming corrugation techniques, the first plurality of corrugations 112 and the second plurality of corrugations 114 may be introduced into the sheet 110 via molding. A mold is used to introduce the first plurality of corrugations 112 and the second plurality of corrugations 114 into a flexible, carbonaceous sheet. A molding surface of the mold has a first plurality of corrugations and a second plurality of corrugations. The first plurality of corrugations within the molding surface is defined by a series of alternating primary ridges and primary grooves extending a length of the molding in a first direction. Each primary ridge and primary groove within the molding surface has a face extending therebetween. Similarly, the second plurality of corrugations within the molding surface is defined by a series of secondary ridges and secondary grooves. The secondary ridges and secondary grooves extend the length of the molding surface in a second direction intersecting with the first direction such that each corrugation within the second plurality of corrugations intersects the face extending between each primary ridge and primary groove within the molding surface.

Cross corrugations are introduced into the flexible, carbonaceous sheet by placing the sheet onto the molding surface, encapsulating the sheet to form a vacuum chamber, and subsequently evacuating the vacuum chamber of any air contained therein. As air is evacuated from the vacuum chamber, the flexible, carbonaceous sheet is drawn upon the molding surface, which causes the sheet to conform to the shape of the molding surface, thereby introducing the first and second plurality of corrugations 112, 114 into the sheet 110. Thermosetting resin is infused into the sheet 110 and cured such that the sheet 110 rigidly retains the first and second plurality of corrugations 112, 114. The size of the sheet 110 as well as the number, dimensions, and orientation of the corrugations of the first plurality of corrugations 112 and second plurality of corrugations 114 within the sheet 110 may be adjusted by changing the design of the molding surface. It follows, then, that a variety of molds having molding surfaces designed for an intended application may be developed and utilized in the above-described manner.

The support members 120 may also be secured to the sheet via thermosetting resin. Thermosetting resins may include, but are not limited to, epoxy, vinyl ester, polyester, polyurethane, or combinations thereof. To promote curing of the thermosetting resin, the resin may be subjected to heat. Alternatively, a co-reactant (hardener) may be admixed with the thermosetting resin to promote curing. In one methodology, the support members 120 may be secured to the sheet 110 by placing the support members 120 on a top side 118 of the sheet prior to infusing the sheet with thermosetting resin and evacuating the vacuum chamber.

Alternatively, the support members 120 may be secured to the sheet 110 by a second application of thermosetting resin applied to the sheet 110 and/or to the support members 120 after a first application of thermosetting resin has been infused into the sheet and cured to harden the sheet 110 into a rigid shape. The support members 120 may be secured to the sheet 110 by placing the support members 120 on a top side 118 and/or bottom side 119 of the sheet 110, applying thermosetting resin to the rigid sheet 110 and/or to the support members 120, and curing the applied resin such that the support members 120 become affixed to the sheet 120. Because the support members 120 may be secured to the sheet 110 via thermosetting resin, the support structure 100 of the present disclosure may be made in piecemeal fashion. For instance, prior to securing the support members 120 to the sheet 110, a plurality of rigid sheets 110 having the same cross corrugation design may be manufactured, subsequently stacked on top of one another, and transported to a designated worksite. Once at the worksite, one or more support members 120 may then be secured to each of the transported sheets 110 via thermosetting resin to create a plurality of support structures 100 on site.

Alternatively, wherein the sheet 110 comprises a malleable material, the first plurality of corrugations 112 and the second plurality of corrugations 114 may be introduced into the sheet 110 via stamping. In such alternative embodiments, a malleable sheet is placed within a stamping press between a tool and die surface. The tool and die surface are designed to introduce the first and second plurality of corrugations 112, 114 disclosed herein into a deformable material disposed therebetween when the die and tool are drawn together. As the tool and the die draw together, the compressive force imposed on the malleable material causes the material to deform such that the first and second plurality of corrugations 112, 114 are introduced into the malleable material.

The support structure 100 may optionally comprise two sheets secured together. As shown in FIG. 7, the support structure 100 may comprise a first sheet 110 having a first and second plurality of corrugations 112, 114 secured to a second sheet 210 having a third and fourth plurality of corrugations 212, 214. The third plurality of corrugations 212 is defined by a series of alternating primary ridges 212(a) and primary grooves 212(b) extending the length of the second sheet 210 in a first direction of the second sheet 210. Like the first sheet 110, a face 216 extends between the primary ridges 212(a) and primary grooves 212(b) of the second sheet 210. The fourth plurality of corrugations 214 is defined by a series secondary ridges 214(a) and secondary grooves 214(b) extending the length of the second sheet 210 in a second direction intersecting with the first direction of the second sheet 210. The intersection of the third plurality of corrugations 212 and the fourth plurality of corrugations 214 creates a plurality of cross corrugations within the second sheet 210. Each corrugation within the fourth plurality of corrugations 214 initially ascends towards each primary ridge 212(a) and subsequently descends towards each primary groove 212(b) of the second sheet 210. As such, each corrugation within the fourth plurality of corrugations intersects the face extending between the primary ridge 212(a) and primary groove 212(b), thereby dividing each face 216 into a plurality of sub-faces within the second sheet 210.

For improved tensile and compressive strengths, the second sheet 210 is preferably a non-malleable, rigid sheet. For instance, the second sheet 210 may comprise a sheet of carbon fiber or graphene corrugated via the molding process described above and cured to rigidly retain such corrugations. Alternatively, the second sheet 210 may comprise any of the other materials disclosed above with respect to the first sheet 110. Moreover, the secondary ridges 214(a) and secondary grooves 214(b) of the fourth plurality of corrugations 214 may be arranged in the same or similar manner as the second plurality of corrugations 114 in the first sheet 110. For instance, each corrugation within the fourth plurality of corrugations 214 preferably comprises a series of linearly alternating secondary ridges 214(a) and secondary grooves 214(b). Alternatively, each corrugation within the fourth plurality of corrugations 214 may comprise either a continuous secondary ridge 214(a) or a continuous secondary groove 214(b).

The first sheet 110 and the second sheet 210 may be secured directly together, or may be secured indirectly together via one or more support members 120, as shown in FIG. 7. For instance, the first and second sheet 110, 210 may be secured together such that a plurality of support members 120 are disposed between the bottom side 119 of the first sheet 110 and the top side of the second sheet 210, as further shown in FIG. 7. In the arrangement shown in FIG. 7, the first sheet 110 may have a first plurality of support members 120 secured to its bottom side 119 and the second sheet 210 may have a second plurality of support members 120 secured to its top side such that the first and second sheet 110, 210 may be secured to each other by securing the first and second plurality of support members 120 to each other. Depending on the intended application, the first sheet 110 and the second sheet 210 may be secured together such that the corrugations of the respective sheets are in phase or out of phase with respect to each other. For instance, as shown in FIG. 7, the first and second sheet 110, 210 may be secured together such that the first plurality of corrugations 112 and the third plurality of corrugations 212 are out of phase and the second plurality of corrugations 114 and the fourth plurality of corrugations 214 are out of phase. Alternatively, the first and second sheet 110, 120 may be secured directly together such that the first plurality of corrugations 112 are in phase with the third plurality of corrugations 212 and the second plurality of corrugations 114 are in phase with the fourth plurality of corrugations 214, causing the first and second sheet 110, 210 to retain a generally stacked configuration. To facilitate such stacked configurations, the arrangement of secondary ridges 114(a) and secondary grooves 114(b) within the corrugations of the second plurality of corrugations 114 is preferably the same as the arrangement of secondary ridges 214(a) and secondary grooves 214(b) within the corrugations of the fourth plurality of corrugations 214 so that the bottom side 119 of the first sheet 110 can be secured squarely within the top of the second sheet 210, or vice versa.

Figure 10:
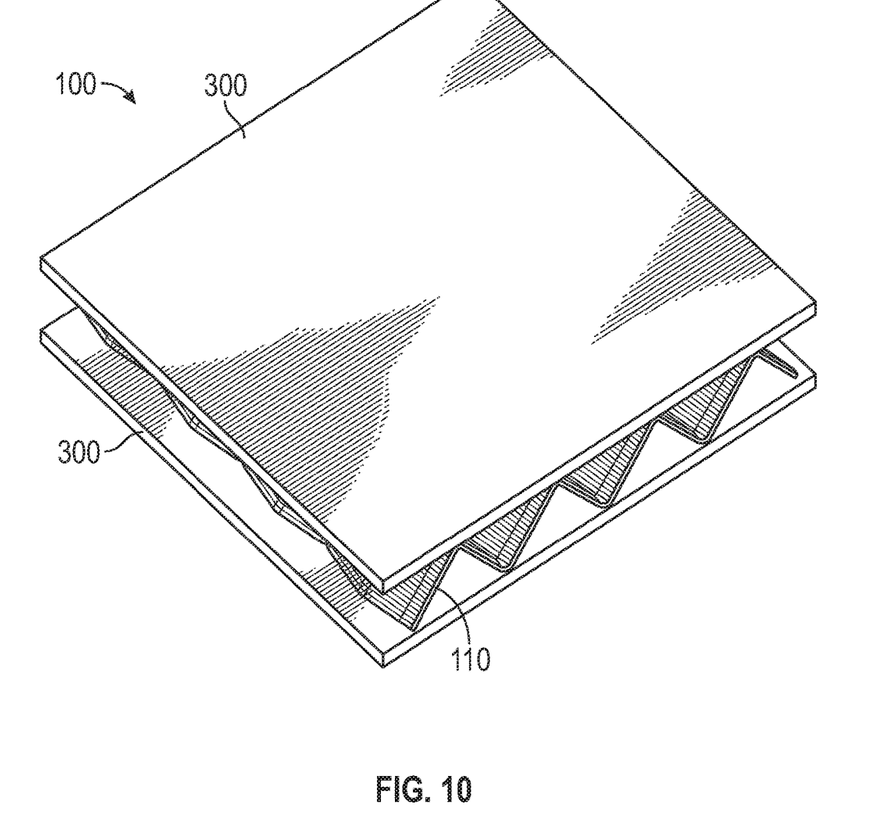
FIG. 10 is a perspective view of a support structure embodying features consistent with the principles of the present disclosure.
Figure 11:
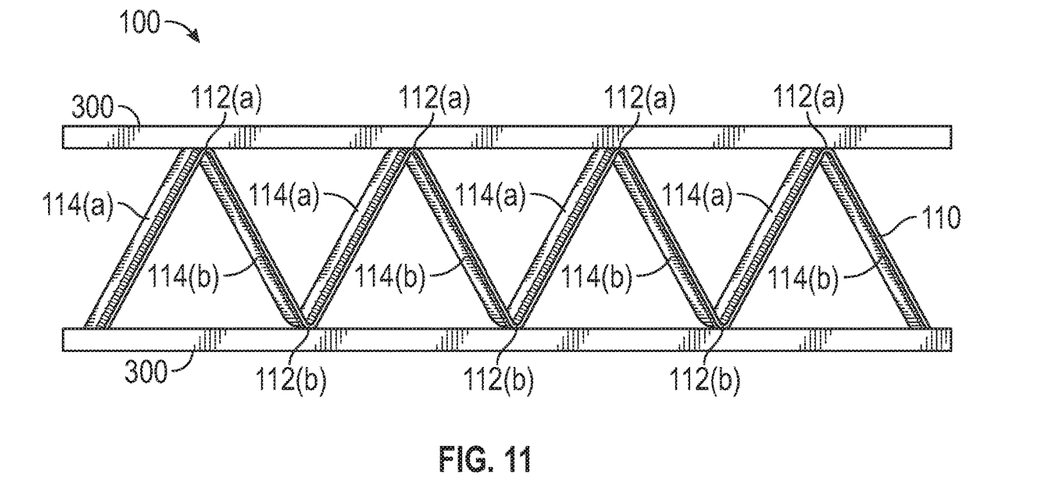
FIG. 11 is a side elevational view of a support structure embodying features consistent with the principles of the present disclosure.

In an alternative embodiment, as shown in FIGS. 10 and 11, the support structure 100 may comprise a support member in the configuration of a faceplate 300 secured to at least one of a top side 118 of the sheet 110 and a bottom side 119 of the sheet 110. The faceplate 300 may have an area that encompasses the entirety of the top side 118 and/or bottom side 119 of the sheet 110 when secured thereto in order to accommodate applications requiring the top side 118 and/or bottom side 119 of the sheet 110 to be covered. As best shown in FIG. 10, each faceplate 300 is a generally flat and relatively thin piece of material. Each faceplate 300 comprises a unitary piece of material that covers both a plurality of adjacent grooves and/or ridges of the first plurality of corrugations 112 and a plurality of adjacent grooves and/or ridges of the second plurality of corrugations 114. Preferably, each faceplate 300 covers all of corrugations of both the first and second plurality of corrugations 112, 114. Alternatively, a plurality of faceplates 300 may be utilized and positioned adjacent one another abutting each other or spaced apart from each other in order to cover all or any portion of the top side and/or bottom side of the sheet 110. The faceplate 300 is preferably rigidly secured to the sheet 110. The faceplate 300 may be permanently secured to the sheet 110 in the same manner as the elongated support members 120, as described herein. For instance the faceplate 300 may be secured to the sheet 110 via thermosetting resin, preferably after the sheet 110 has been molded into a rigid shape having a first and second plurality of corrugations 112, 114. Thermosetting resin may be applied to the faceplate 300, to the molded sheet 110, or to both components to secure the faceplate 300 to the sheet 110. As shown in FIG. 11, the support structure 100 preferably has a top faceplate 300 and a bottom faceplate 300. As shown in FIG. 7, the support structure 100 may optionally comprise a plurality of sheets 110 secured together. In an alternative embodiment utilizing faceplates 300 with multiple sheets 110 secured together, adjacent sheets 110 may be secured to each other by securing the faceplates 300 of adjacent sheets 110 to each other or the faceplate 300 of one sheet 110 to the top side or bottom side of an adjacent sheet 110. The faceplates 300 of adjacent sheets 110 may be secured to each other using thermosetting resin or any other suitable material, fasteners, or tools.

The present disclosure provides a cross-corrugated support structure in accordance with the independent claims. Preferred embodiments of the invention are reflected in the dependent claims. The claimed invention can be better understood in view of the embodiments described and illustrated in the present disclosure, viz. in the present specification and drawings. In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the invention per se.

It is understood that versions of the inventive subject matter of the present disclosure may come in different forms and embodiments. Additionally, it is understood that one of skill in the art would appreciate these various forms and embodiments as falling within the scope of the inventive subject matter disclosed herein.

What is claimed is:

1. A cross-corrugated support structure comprising:
   a rigid sheet having a first plurality of corrugations and a second plurality of corrugations,
      the first plurality of corrugations being defined by a series of alternating primary ridges and primary grooves extending a length of the sheet in a first direction,
         wherein each primary ridge and primary groove has a face extending therebetween,
      the second plurality of corrugations being defined by a series of secondary ridges and secondary grooves extending a length of the sheet in a second direction intersecting with the first direction such that each corrugation within the second plurality of corrugations intersects the face extending between each primary ridge and primary groove, wherein each secondary ridge and secondary groove is disposed on a surface of the face extending between each primary ridge and primary groove; and
   a plurality of elongated support members each secured to the sheet, wherein each of the plurality of support members is secured to a same side of the sheet.

2. The support structure of claim 1, wherein each corrugation within the second plurality of corrugations comprises a series of linearly alternating secondary ridges and secondary grooves.

3. The support structure of claim 1, wherein each corrugation within the second plurality of corrugations comprises a secondary ridge or a secondary groove.

4. The support structure of claim 3, wherein the second plurality of corrugations alternates between corrugations comprising secondary ridges and corrugations comprising secondary grooves.

5. The support structure of claim 3, wherein each of the plurality of elongated support members is secured within at least one of a corrugation comprising a secondary ridge within the second plurality of corrugations and a corrugation comprising a secondary groove within the second plurality of corrugations.

6. The support structure of claim 1, wherein each of the plurality of elongated support members is secured to one of
   a top side of the sheet such that each respective one of the elongated support members is transversely secured to each primary ridge and bridges each primary groove and
   a bottom side of the sheet such that each respective one of the elongated support members is transversely secured to each primary groove and bridges each primary ridge.

7. The support structure of claim 1, wherein the sheet comprises a carbonaceous material.

8. The support structure of claim 1, wherein each face extending between the primary ridges and the primary grooves has a bore extending therethrough, wherein each bore within the sheet is aligned with at least one other bore within the sheet such that each of the plurality of elongated support members is secured to the sheet when inserted through at least two bores within the sheet.

9. A cross-corrugated support structure comprising:
   a carbonaceous rigid sheet having a first plurality of corrugations and a second plurality of corrugations,
      the first plurality of corrugations being defined by a series of alternating primary ridges and primary grooves extending a length of the sheet in a first direction,
         wherein each primary ridge and primary groove has a face extending therebetween,
      the second plurality of corrugations being defined by a series of secondary ridges and secondary grooves extending a length of the sheet in a second direction perpendicular to and intersecting with the first direction such that each corrugation within the second plurality of corrugations intersects the face extending between each primary ridge and primary groove such that each face is divided into a plurality of sub-faces, wherein each secondary ridge and secondary groove is disposed on a surface of the face extending between each primary ridge and primary groove; and
   a plurality of elongated support members secured to the sheet such that each support member of the plurality of support members bridges at least one of each of the primary ridges and each of the primary grooves.

10. The support structure of claim 9, wherein each corrugation within the second plurality of corrugations comprises a series of linearly alternating secondary ridges and secondary grooves.

11. The support structure of claim 9, wherein each corrugation within the second plurality of corrugations comprises a secondary ridge or a secondary groove.

12. The support structure of claim 11, wherein the second plurality of corrugations alternates between corrugations comprising secondary ridges and corrugations comprising secondary grooves.

13. The support structure of claim 9, wherein each sub-face of the plurality of sub-faces has a bore extending therethrough,
   the bore of each sub-face being aligned with the bore of an opposite sub-face, and wherein each support member of the plurality of support members is secured to the sheet when inserted through a series of aligned bores.

14. The support structure of claim 9, wherein the plurality of support members is secured to at least one of a top side of the sheet and a bottom side of the sheet.

15. A cross-corrugated support structure comprising:
   a first rigid sheet having a first plurality of corrugations and a second plurality of corrugations,
      the first plurality of corrugations being defined by a series of alternating primary ridges and primary grooves extending a length of the first sheet in a first direction,
         wherein each primary ridge and primary groove of the first sheet has a face extending therebetween,
      the second plurality of corrugations being defined by a series of secondary ridges and secondary grooves extending the length of the sheet in a second direction intersecting with the first direction such that each corrugation within the second plurality of corrugations intersects the face extending between each primary ridge and primary groove of the first sheet;
   a second rigid sheet secured to the first sheet, the second sheet having a third plurality of corrugations and a fourth plurality of corrugations,
      the third plurality of corrugations being defined by a series of alternating primary ridges and primary grooves extending a length of the second sheet in a first direction,
         wherein each primary ridge and primary groove of the second sheet has a face extending therebetween,
      the fourth plurality of corrugations being defined by a series of secondary ridges and secondary grooves extending the length of the second sheet in a second direction intersecting with the first direction such that each corrugation within the second plurality of corrugations intersects the face extending between each primary ridge and primary groove of the second sheet
   wherein the second sheet is secured to the first sheet such that the first plurality of corrugations is out of phase with the third plurality of corrugations and the second plurality of corrugations is out of phase with the fourth plurality of corrugations.

16. The support structure of claim 15, further comprising a support member secured to at least one of the first sheet and the second sheet.

17. The support structure of claim 16, wherein the support member comprises a faceplate.

18. The support structure of claim 15, wherein each corrugation within the second plurality of corrugations and each corrugation within the fourth plurality of corrugations comprises a series of linearly alternating secondary ridges and secondary grooves.

19. The support structure of claim 15, wherein each corrugation of the second plurality of corrugations and each corrugation of the fourth plurality of corrugations comprise a secondary ridge or a secondary groove.

* * * * *